United States Patent
Vaughan

(10) Patent No.: US 7,983,622 B1
(45) Date of Patent: Jul. 19, 2011

(54) USING PHASE DIFFERENCE TO DETERMINE VALID NEIGHBORS

(75) Inventor: Gary Vaughan, Centennial, CO (US)

(73) Assignee: Sprint Spectrum L.P., Overland Park, KS (US)

( * ) Notice: Subject to any disclaimer, the term of this patent is extended or adjusted under 35 U.S.C. 154(b) by 670 days.

(21) Appl. No.: 12/047,081

(22) Filed: Mar. 12, 2008

(51) Int. Cl.
*H04B 17/00* (2006.01)
(52) U.S. Cl. .................... 455/67.16; 455/67.11; 455/304
(58) Field of Classification Search ............... 455/67.11, 455/67.16, 304, 434, 438
See application file for complete search history.

(56) References Cited

U.S. PATENT DOCUMENTS 7,536,167 B2 * 5/2009 Gollnick et al. ............ 455/343.4
7,801,487 B2 * 9/2010 Mehrabanzad et al. ..... 455/63.1

* cited by examiner

*Primary Examiner* — Tuan H Nguyen

(57) ABSTRACT

A method and system is disclosed for using phase shift to determine valid neighbors in a wireless communication system. A phase difference, measured at an access terminal, between an expected phase and an observed phase of a pilot signal from a given wireless service site is used to determine a differential distance. The differential distance corresponds to a difference between (i) the distance from the access terminal to the given wireless service site and (ii) the distance from the access terminal to a serving wireless service site. The expected phase is taken to be that of a known neighbor site of the access terminal, based on a postulation that the given site is the neighbor site. Upon a determination that the differential distance does not exceed a threshold distance, the given wireless service site is confirmed as being the neighbor site.

23 Claims, 8 Drawing Sheets

USING PHASE DIFFERENCE TO DETERMINE VALID NEIGHBORS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway.

With the explosive growth in demand for wireless communications, the level of call traffic in most cell sites has increased dramatically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor the power level of beacons referred to as "pilot signals" from various available "neighbor" sectors, and notify the BSC when a given neighbor sector has a signal strength that is sufficiently higher than the sector in which the AT is currently operating, or higher than some threshold. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

In monitoring pilot signals as described above, it is sometimes possible for an access terminal to misidentify a particular pilot signal as being one transmitted from a neighbor sector (or other form of coverage area), when the particular pilot signal is actually being transmitted from a different sector that may not even be a neighbor. Moreover, the sector that the access terminal thinks it is detecting at a sufficient power level to support a handoff may actually not be detectable by the access terminal above a requisite threshold. The access terminal may then send a message to the serving base station with an indication of the identity of the sector and its pilot signal power level as measured by the AT. If the base station then responds by directing the access terminal to include the misidentified sector among one or more other sectors from which the AT can seek service, the access terminal may attempt to hand off to the undetectable (or insufficiently-detectable) sector. Such a mistaken handoff can have adverse effects including, among others, dropping an active call or data session.

In accordance with embodiments of the present invention, relative phases of pilot signals received at an access terminal may be combined with distance information to determine valid neighbor sectors (or other forms of wireless coverage area) in a wireless communication system. More specifically, a phase difference, measured at an access terminal, between an expected phase and an observed phase of a pilot signal received from a given wireless service site can be used to determine a differential distance, wherein the differential distance corresponds to a difference between (i) the distance from the access terminal to the given wireless service site and (ii) the distance from the access terminal to a serving wireless service site. The pilot signal from the serving wireless service site is used to set a reference phase, with respect to which the observed phase of the particular pilot signal is determined. The expected phase is taken to be that of a known neighbor site of the access terminal, based on a postulation that the given site is the neighbor site. Upon a determination that the differential distance does not exceed a threshold distance, the given wireless service site is confirmed as being the neighbor site, and is thereby a valid site for providing service to the access terminal.

Hence in one respect, various embodiments of the present invention provide a method for confirming that a wireless service site is valid choice for providing service to an access terminal, wherein the method comprises receiving a particular signal at the access terminal from the wireless service site, determining a phase shift of the particular signal relative to an expected phase of the particular signal, converting the determined phase shift into a differential distance, and confirming the wireless service site to be a valid choice for providing service to the access terminal upon a determination that the differential distance does not exceed a threshold distance. Preferably, the expected phase is determined by postulating the identity of the wireless service site to be one whose expected phase is known, so that the confirmation thereby validates that the postulated identity as being correct. In accordance with an exemplary embodiment, the postulated identity is that of a neighbor sector.

Determining the phase shift preferably comprises receiving a reference signal at the access terminal from a serving wireless service site, determining a reference phase based on the reference signal, determining an observed phase of the particular signal relative to the reference phase, and computing the phase shift as a difference between the observed phase of the particular signal and the expected phase of the particular signal. In principle, the phase shift corresponds to a time difference between (i) a propagation delay of the particular signal from the wireless service site to the access terminal and (ii) a propagation delay of the reference signal from the serving wireless service site to the access terminal. As such, converting the determined phase shift into the differential distance may be accomplished by multiplying the time difference by a known propagation speed of the particular signal by the time difference.

In practice, the phase shift can be positive, negative, or zero, and the differential distance may correspondingly be positive, negative, or zero. As a further aspect of the method, confirming the wireless service site to be a valid choice for providing service to the access terminal comprises determining a reference distance between the access terminal and the serving wireless service site, determining an inter-site distance between the wireless service site and the serving wireless service site, setting the threshold distance to (i) the reference distance if the differential distance is negative, or (ii) the inter-site distance if the differential distance is positive or zero, and confirming the postulated identity of the wireless site to be the identity of the wireless service site upon a determination that an absolute value of the differential distance does not exceed the threshold distance. Preferably, the reference distance will be computed from one half of the round-trip delay of a timing signal between the access terminal and the serving wireless service site, and the inter-site distance will be determined from known latitude and longitude of the wireless service site and the serving wireless service site.

In accordance with the exemplary embodiment, the particular signal is a pilot signal of the wireless service site encoded using a pseudo-random number (PN) sequence and a PN offset associated with the site. Then, determining the phase shift of the particular signal comprises postulating an expected chip index of the PN sequence and computing the phase shift as a difference between the expected chip index and an observed chip index of the particular signal. In this case, the expected chip index is the expected phase, and postulating the expected chip index comprises receiving a reference pilot signal at the access terminal from a serving wireless service site, determining a reference chip index based on the reference pilot signal, determining the observed chip index of the particular signal as a chip index of the particular signal, counted relative to the reference chip index, at which a measured power level at the access terminal exceeds a threshold power level, and postulating the expected chip index to be a specific one of a plurality of particular chip indexes according to a likely match between the specific chip index and the observed chip index. Preferably, the plurality of particular chip indexes corresponds to a plurality of known PN offsets, for example, to PN offsets of neighbor sectors. Thus, postulating the expected chip index corresponds to postulating the wireless service site to be one of the neighbor sectors.

In further accordance with the exemplary embodiment, the phase shift can be measured as a number of chips of the PN sequence, with the particular signal being transmitted from the wireless service site according to a rate of R chips per unit time. Then, converting the phase shift into the differential distance comprises computing the differential distance by dividing a propagation speed of the particular signal by R and multiplying by the number. Again, with the differential distance being positive, negative, or zero, confirming the wireless service site to be a valid choice for providing service to the access terminal comprises setting the threshold distance to (i) a reference distance between the access terminal and the serving site if the differential distance is negative, or (ii) a known inter-site distance if the differential distance is positive or zero, and confirming the postulated identity of the wireless site to be the identity of the wireless service site upon a determination that an absolute value of the differential distance does not exceed the threshold distance.

The method carried out in accordance with the exemplary embodiment, or possibly one or more alternative embodiments, may be implemented at a radio access network, wherein the radio access network includes at least one of (i) a base transceiver station, (ii) a base station controller, and (iii) a radio node controller.

In another respect, various embodiments of the present invention provide a method for confirming that a wireless service site is valid choice for providing service to an access terminal, wherein the method comprises, at the access terminal, receiving both a particular pilot signal from the wireless service site and a reference pilot signal from a serving wireless service site, determining an observed phase of the particular pilot signal relative to a reference phase of the reference pilot signal, sending a message from the access terminal to a radio access network, wherein the message contains information indicative of at least the observed phase of the particular pilot signal, at a radio access network, determining a phase shift of the particular pilot signal relative to an expected phase of the particular pilot signal, at the radio access network, converting the determined phase shift into a differential distance, and at the radio access network, confirming the wireless service site to be a valid choice for providing service to the access terminal upon a determination that the differential distance does not exceed a threshold distance. The expected phase preferably is determined by postulating the identity of wireless service site to be one whose expected phase is known, so that the confirmation thereby validates that the postulated identity as being correct.

The method could be carried out in a wireless communication system that (i) comprises radio access networks, each with at least one wireless service site, and (ii) provides service to access terminals. In accordance with an exemplary embodiment, the wireless communication system could operate according to a CDMA family of protocols, and both the particular pilot signal and the reference pilot signal could be encoded using a pseudo-random number (PN) sequence and PN offsets respectively associated with the wireless service site and the serving wireless service site. Then, determining the observed phase of the particular pilot could then comprises determining a reference chip index based on the reference pilot signal and determining an observed chip index of the particular pilot signal as a chip index of the particular pilot signal, counted relative to the reference chip index, at which a measured power level at the access terminal exceeds a threshold power level. Preferably, the message will be a Pilot Strength Measurement Message.

In further accordance with the exemplary embodiment, determining the phase shift could comprise postulating an expected PN offset of the wireless service site, wherein the expected PN offset corresponds to an expected chip index, and computing the phase shift as a difference between the expected chip index and the observed chip index of the particular pilot signal. As above, the phase shift can be measured as a number of chips of the PN sequence, which are related to a positive, negative, or zero differential distance according to a chip rate. Then, confirming the wireless service site to be a valid choice for providing service to the access terminal comprises setting the threshold distance to (i) a reference distance between the access terminal and the serving site if the differential distance is negative, or (ii) a known inter-site distance if the differential distance is positive or zero, and confirming the postulated identity of the wireless site to be the identity of the wireless service site upon a determination that an absolute value of the differential distance does not exceed the threshold distance.

In yet a further respect, various embodiments of the present invention provide, in a wireless communication system comprising a radio access network that includes wireless service sites and that provides service to access terminals, an improvement comprising means for receiving at an access terminal both a particular pilot signal from a wireless service site and a reference pilot signal from a serving wireless service site, means for determining an observed phase of the particular pilot signal relative to a reference phase of the reference pilot signal, means for sending a message from the access terminal to a radio access network, wherein the message contains information indicative of at least the observed phase of the particular pilot signal, means for determining a phase shift of the particular pilot signal relative to an expected phase of the particular pilot signal, wherein the expected phase is indicative of a postulated identity of the wireless service site, means for converting the determined phase shift into a differential distance, and means for confirming the wireless service site to be a valid choice for providing service to the access terminal upon a determination that the differential distance does not exceed a threshold distance.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
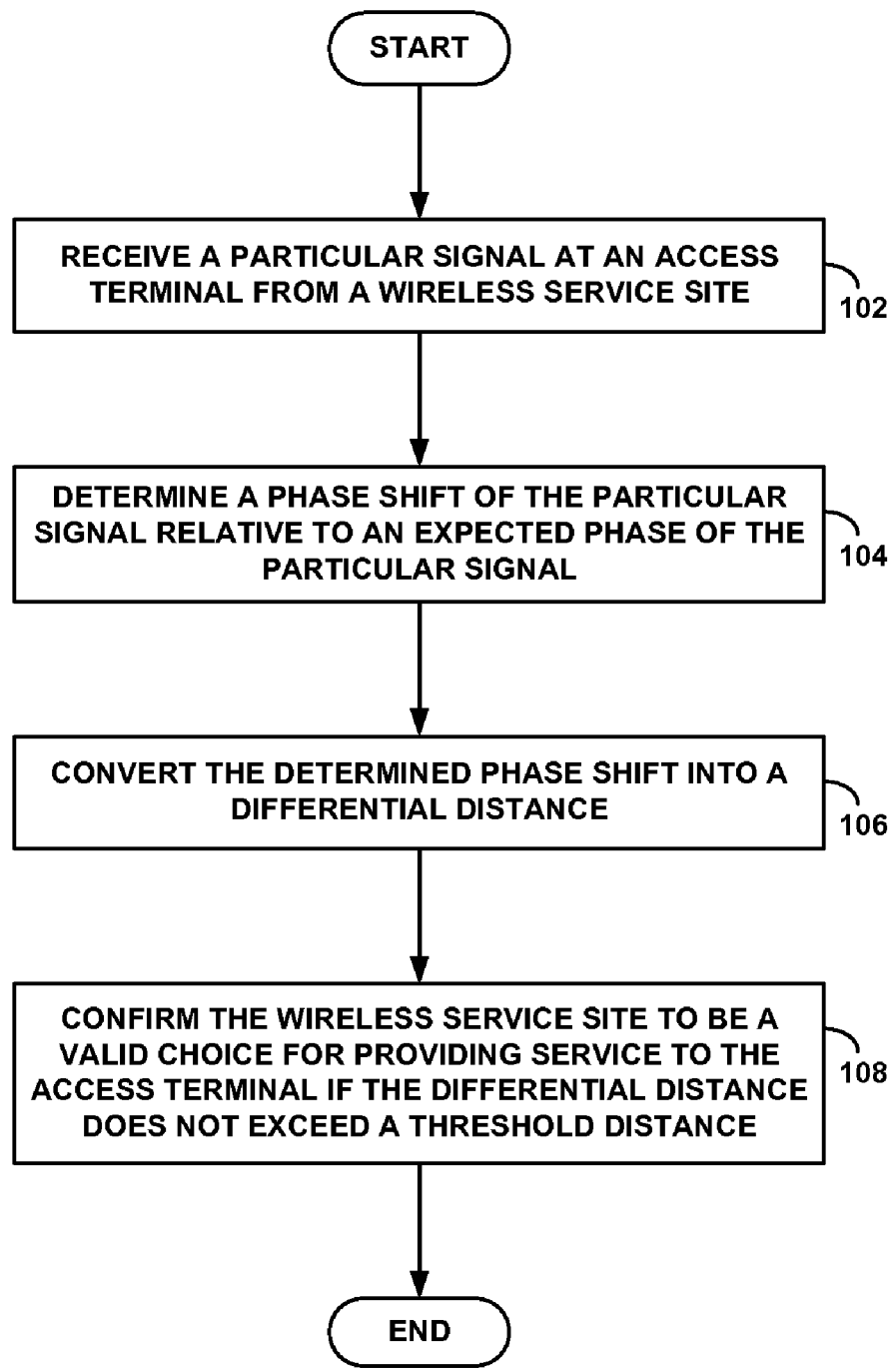
FIG. 1 is a flowchart illustrating an exemplary embodiment of using phase difference to determine valid neighbors.

FIG. 1 is a flowchart illustrating use of phase difference to determine valid neighbors. At step 102 a particular signal is received at an access terminal from a wireless service site. In an exemplary embodiment, the access terminal could be operating in a CDMA-based wireless communication system that comprises wireless service sites. In this embodiment, the particular signal can be a pilot signal and the wireless service site can be a BTS of a sector. However, other types of signals could be used, as could other forms of wireless service sites.

At step 104, a phase shift of the particular signal is determined relative to an expected phase of the signal. Preferably, the expected phase of the signal will be based on a postulated identity of the wireless service site. For example, taking the signal to be a pilot signal from the wireless service site, an expected phase of the signal could be based on a postulation that particular signal is from a site that is one of the access terminal's neighbor sites. Then, knowing the PN offset of the neighbor site, the expected phase (e.g., a chip index) could be determined. The phase shift would preferably be computed as a difference between the observed phase (or observed chip index) of the particular signal and the expected phase (or chip index) of a pilot signal from the neighbor site.

The observed phase of the particular signal can be determined relative to a reference phase. In accordance with the exemplary embodiment, the reference phase will be determined based on a reference signal from a serving wireless service site. For instance, the reference signal could be a pilot signal from a serving sector.

At step 106, the phase shift is converted into a differential distance. This distance corresponds to a difference between (i) the distance from the access terminal to the wireless service site, and (ii) the distance from the access terminal to the serving wireless service site. With the phase shift corresponding to a time difference in the respective propagation delays of the particular signal from the wireless service site and the reference signal from the serving wireless service site, converting the phase shift to the differential distance can be accomplished by multiplying the phase shift by a known speed of propagation of the particular signal. Typically, this speed is the speed of light. Note that if the phase shift is expressed in terms of a number of chips of a PN sequence, wherein signals are transmitted at a rate of R chips per unit time, then the differential distance can be computed as the propagation speed divided by R and then multiplied by the number of chips in the phase shift.

Finally, at step 108, the wireless service site is confirmed to be a valid choice for providing service to the access terminal upon a determination that the determined differential distance does not exceed a distance threshold. In the exemplary embodiment, the distance threshold will be (i) a reference distance from the access terminal to the serving wireless service site if the phase shift is negative, or (ii) a known distance from the serving wireless service site to the postulated wireless service site if the phase shift is positive or zero. If differential distance exceeds the threshold distance, then the postulated identity of the wireless service site can be deemed a mis-identification, and the site ruled out as a valid choice for providing service to the access terminal. If the differential distance does not exceed the threshold distance, then the postulated identity can be deemed correct, and the wireless service site ruled a valid choice for providing service to the access terminal. In this case the access terminal may be instructed to add the neighbor site to its active set, as described in more detail below. To the extent that the postulated identity is that of one of the access terminal's neighbor sites, then a confirmation that the site is a valid choice for providing service to the access terminal can be considered as a confirmation the site that transmitted the particular signal is a valid neighbor.

It should be understood that FIG. 1 is illustrative of steps that may be employed in an exemplary embodiment, and that additional and/or alternative steps may be used. Further, the principles illustrated by the steps in FIG. 1 may be used in various alternative embodiments of the present invention.

Figure 2:
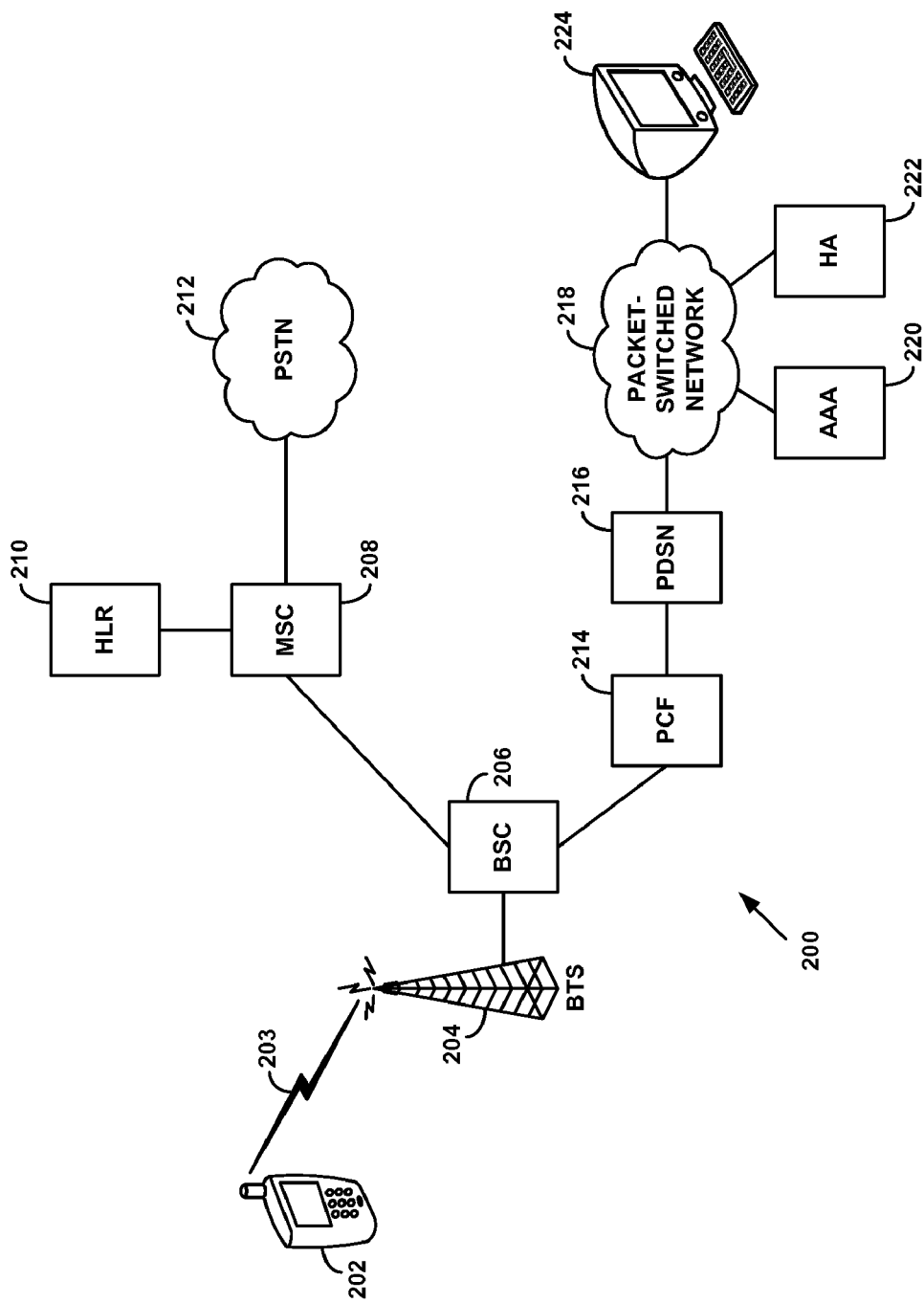
FIG. 2 is a simplified block diagram of a wireless communication system in which an exemplary embodiment of using phase difference to determine valid neighbors can be employed.

FIG. 2 shows a simplified block diagram of a wireless communication system 200 in which an exemplary embodiment of using phase difference to determine valid neighbors can be employed. Access terminal AT 202 communicates over an air interface 203 with a BTS 204, which is then coupled or integrated with a BSC 206. Transmissions over air interface 203 from BTS 204 to AT 202 represent the "forward link" to the access terminal. Transmissions over interface 203 from AT 202 to BTS 204 represent the "reverse link."

BSC 206 in turn is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over air interface 203, AT 202 may send a request to PDSN 216 for a connection in the packet data network. Then, following authentication of the access terminal by AAA server 220, AT 202 may be assigned an IP address by the PDSN or by HA 222, and may thereafter engage in packet-data communications with entities such as remote computer 224.

It should be understood that the depiction of just one of each element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, system 200 and AT 202 together are representative of exemplary means of implementing and carrying out the various functions, steps, and procedures described herein.

Figure 3:
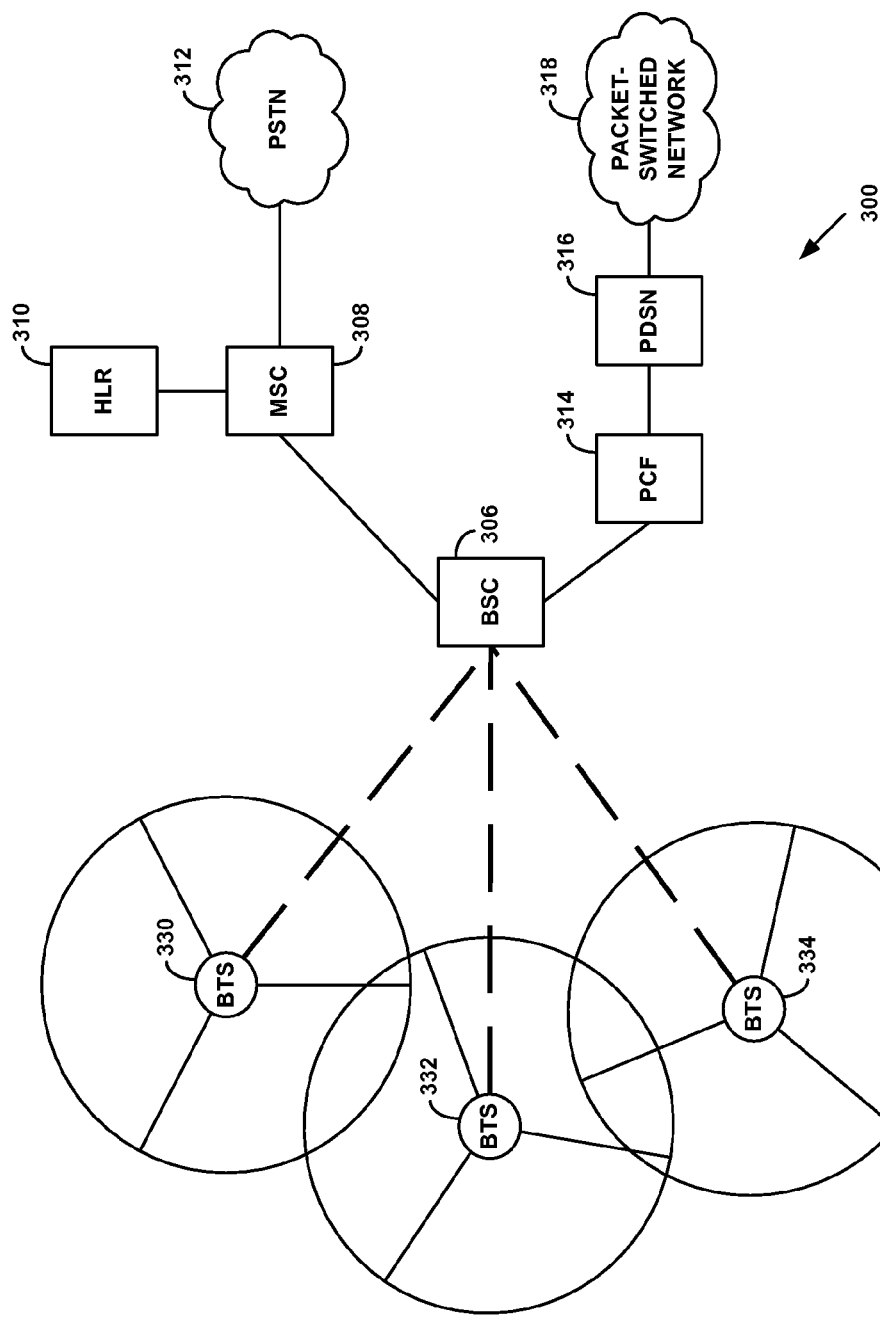
FIG. 3 is a simplified block diagram illustrating an exemplary configuration of physical sectors in a wireless communication system in which using phase difference to determine valid neighbors can be employed.

In practice, a BSC may serve multiple BTSs, each of which may then radiate to define a given cell and a plurality of cell sectors. This arrangement is illustrated in FIG. 3, which shows BSC 306 in network 300 coupled with three BTSs 330, 332, and 334. Each BTS is shown at the core of a respective circle representing a cell, and each cell is divided into three pie-pieces representing sectors. With this arrangement, an access terminal can operate in any of the sectors and can connect, via a serving BTS, with MSC 308 for circuit-based services in the wireless communication system and beyond (e.g., in PSTN 312). Through its serving sector, an access terminal can also communicate, via PCF 314 and PDSN 316, on packet network 318. Note that the depiction of three wireless services sectors for each of the BTSs in FIG. 3 is exemplary, and other numbers of sectors per BTS are possible. Further, the relative positions of the BTSs and the relative angular orientations of the sectors are also illustrative, and other arrangements may be used.

Throughout this description, the term "base station" will used to refer to a radio access network element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA COMMUNICATIONS

The present invention will be described by way of example with reference to Code Division Multiple Access ("CDMA") communications in general, and to IS-2000 communications in particular. However, it should be understood that the invention can apply to other CDMA families of protocols for wireless voice and data, including IS-95, IS-856, and GSM.

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, an access terminal can engage in cellular voice or packet-data communications. Referring again to FIG. 2, and taking an originating call as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

Under IS-2000, an access terminal can communicate with a number of "active" sectors at a time. Depending on the system, the number of active sectors can be up to three or six (currently). The access terminal receives largely the same signal from each of the active sectors and, on a frame-by-frame basis, selects the best signal to use. An access terminal maintains in its memory a list of the active sectors, identified according to their PN offsets. This list comprises the AT's "active set."

Operationally, an IS-2000 system is typically arranged to transmit the same data concurrently in some or all of the sectors in a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors in the AT's active set provides an added level of reliability to communications, as well as possibly increased quality owing to improved signal to noise characteristics. The concurrency also facilitates a form of seamless handoff between sectors, referred to as "soft handoff" when the handoff is between sectors of different BTSs, and "softer handoff" when the handoff is between sectors of the same BTS.

In addition to its active set, the AT maintains in its memory a list of "candidate" sectors (typically up to six), which are those sectors that are not yet in the active set but that have sufficient signal strength that the access terminal could demodulate signals from those sectors. Further, the mobile maintains a list of "neighbor" sectors, which are those sectors not in the active set or candidate set but are in close vicinity to the access terminal and deemed by the wireless communication system to be ones that the access terminal should monitor for eligibility as candidate sectors. All other possible sectors are members of a "remaining" set.

To facilitate a determination of which sectors should be in the access terminal's active and candidate sets, all base stations emit a pilot channel signal, typically at a power level higher than other forward link signals. An access terminal then constantly measures the strength of each pilot that it receives and notifies a primary base station (a base station currently serving the access terminal) when pilot strength falls above or below designated thresholds. The base station, in turn, provides the access terminal with an updated list of active pilots.

More particularly, according to the well known EIA/TIA/IS-95 standard or EIA/TIA/IS-2000 standard, the base station initially provides the access terminal with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station initially provides the access terminal with a Neighbor List Update Message (NLUM), which identifies the "neighbor" sectors for the current active set.

The access terminal then monitors all of the pilot signals that it receives, measuring signal strength for each as $E_c/I_o$, where $E_c$ is energy per chip and $I_o$ is the total power received. If the pilot signal strength of any neighbor sector exceeds T_ADD, the access terminal adds the pilot to its "candidate" set and sends a Pilot Strength Measurement Message (PSMM) to the base station with the estimated $E_c/I_o$ for the pilot and information indicative of the identity of the sector. If the pilot strength exceeds any active sector signal by T_COMP, and depending on current capacity and other issues, the base station may then send an HDM to the access terminal, listing the pilot as a new member of the active set. Upon receipt of the HDM, the access terminal then adds the pilot to its active set as instructed, and the access terminal sends a Handoff Completion Message (HCM) to the base station, acknowledging the instruction, and providing a list of the pilots (PN offsets) in its active set. Depending on system configuration, the access terminal may also identify pilot signals from the remaining set of sectors if they exceed the thresholds.

Similarly, if the access terminal detects that the signal strength of a pilot in its active set drops below T_DROP, the access terminal starts a handoff drop timer. If T_TDROP passes, the access terminal then sends a PSMM to the base station, indicating the $E_c/I_o$ and drop timer. The base station may then respond by sending an HDM to the access terminal, without the pilot in the active set. The access terminal would then receive the HDM and responsively move the pilot to its neighbor set and send an HCM to the base station.

2. DETERMINING VALID NEIGHBORS FROM PHASE SHIFT

In monitoring pilot signals as described above, it is possible for an access terminal to misidentify a particular pilot signal as being one transmitted from a sector (or other form of coverage area) in the access terminal's neighbor list, when the particular pilot signal is actually being transmitted from a different sector that may not even be in the neighbor list. Moreover, the sector that the access terminal thinks it is detecting at a power level exceeding T_ADD may actually not be detectable by the access terminal above the requisite threshold. As described above, the access terminal will add to its candidate list the sector that it thinks it detects (i.e., the misidentified sector), and send a PSMM to the serving base station with an indication of the identity of the sector and its pilot signal power level as measured by the AT. If the base station then responds with an HDM (or other message) directing the access terminal to add the misidentified sector to the active set, the access terminal will attempt a soft hand off to the undetectable (or insufficiently-detectable) sector. Such a mistaken handoff can have adverse effects including, among others, dropping an active call or data session.

In accordance with an exemplary embodiment of the present invention, the base station (or other network entity) will advantageously use phase information contained in pilot signals as received at access terminals in order to avoid such misidentifications, and consequently improve and enhance the reliability and quality of service provided to access terminals. In order describe how phase shift may be used to determine valid neighbors, it is useful to consider in more detail the process by which an access terminal monitors pilot signals.

One aspect of the exemplary embodiment (and others) discussed herein, as well as of the underlying principles, is the distance between the access terminal and the element of wireless network, such as a BTS, that emits one or more pilot signals and that provides an air interface to the access terminal within one or more coverage areas. Another aspect is the distance between any two of such network elements. Terms such as "sector" and/or "cell" are sometimes used to refer both to a distinct network element (i.e., one at a point or location) as well as to a physical region of an associated coverage area, the particular usage usually being clear from context. However, for the purposes of the present discussion, the term "wireless service site" will be used to refer to a network element that provides an air interface to access terminals and that has an explicit location. Thus, an access terminal that is being provided wireless service within a sector, cell, or other form of coverage area associated with a wireless service site can be said to be at a particular distance from that wireless service site. Similarly, one wireless service site can be said to be at a particular distance from another.

Examples of wireless service sites include, without limitation, BTSs, base stations, BSCs, RNCs, and RANs. Further, each of these network elements could comprise one or more wireless service sites. For instance, a BTS that radiates three sectors could be considered to comprise three wireless service sites, one for each sector. In this case, the distance between the three wireless service sites would be zero. Similarly, a base station, BSC, RNC, or RAN that includes more than one BTS (or similar transceiver element) could be considered to comprise one or more wireless service sites per included BTS. Other arrangements are possible as well.

In view of the preceding discussion, the sectors comprising the active, candidate, neighbor, and remaining sets of an access terminal may each be considered to be a different wireless service site. Each wireless service site synchronously emits a pilot signal, typically at a power level that exceeds that of other forward channels emitted by the site. In practice, each pilot signal comprises a continuous input signal representing a string of binary zeros (or other system-wide, common sequence of data symbols), each input signal being encoded using the same repeating (periodic) pseudo-random number (PN) sequence, but with a site-specific index within the periodic PN sequence as a starting point.

Under IS-2000 (and other CDMA families of protocols), the PN sequence, also referred to as the "PN short code" (or just "short code"), comprises a sequence of $2^{15}$=32,768 ones and zeros in roughly equal numbers and randomly ordered over the length of the sequence. The short code is pseudo-random in the sense that it is generated by a computer program or logic circuit that emulates randomness over the length of the sequence, but that repeats the identical sequence if generation continues past the end of the sequence. The encoding process comprises a spreading of the continuous input signal by the short code, each one or zero of the short code being applied sequentially as a modulation factor. Once a full sequence of the short code has been applied, the modulation process repeats. As applied in modulation, each one or zero of the short code is referred to as a "chip," and the modulation process operates at a rate of 1.2288 mega-chips per second (Mcps), although other rates could be used. Thus one cycle of modulation by the short code takes 26.67 ms, and encoding repeats identically every 32,768 chips or 26.67 ms. Additionally, it is customary to speak of transmissions in terms of chips and chip rates.

Because the modulation is periodic with a period equal to the length of the short code (in chips), the starting point (or starting phase) within the short code sequence is, in principle, arbitrary. That is, each chip of the short code is at a unique position or "chip index" of the PN sequence, and each chip index (and the one or zero value of the chip at that chip index) repeats with the periodicity of the short code. Thus, the periodicity of the modulation can, in principle, be referenced to any chip index of the short code, where the chip indexes run from i=1 to i=32,768.

Transmissions from wireless service sites of a wireless communication system are synchronized among sites such that the chip-by-chip modulations carried out by each wireless service site are aligned in time with those carried out by every other wireless service site. In practice, each wireless service site is assigned a specific chip index as starting point within the short code. More specifically, a sub-sequence of N chip indexes comprising every $K^{th}$ index of the 32,768 total chip indexes is constructed, such that 32,768/K=N is an integer. The number K defines an offset spacing between chip indexes, and the $j^{th}$ element of the sub-sequence is the chip index given by j×K, where j=1, . . . , N. The number j is referred to as the "PN offset," and each wireless service site is assigned a starting chip index in the short code by assigning the site a specific one of the N total PN offsets.

Under IS-95 and IS-2000 (and other CDMA families of protocols), K=64 and N=512, although other values could be used. Thus, there are 512 PN offsets corresponding to every $64^{th}$ chip index of the short code, starting at chip index 64 (or PN offset=1). As such, a unique PN offset can be assigned to up to 512 wireless service sites. If there are more than 512 sites, one or more PN offsets would need to be shared among sites. In practice, some wireless communication systems may only use every second or every third PN offset (effectively increasing the offset spacing K), thus reducing the total number of sites that may be assigned unique PN offsets. Note that the term "PN offset m" is often customarily shortened to just "PN m." For instance, "PN offset 18" would be referred to as just "PN 18."

Operationally, encoding is actually accomplished using two different PN short codes concurrently. However, at any given wireless service site, a single PN offset is used to set the starting chip index in both of the short codes. Thus, without loss of generality with respect to the present invention, the term "PN short code" or "short code" may be considered herein as referring to both PN short codes used by a wireless service site, since it is the PN offset that distinguishes one wireless service site from another.

As an example, if three wireless service sites A, B, and C have respective PN offsets 56, 210, and 360, then they will use starting chip indexes (j×K) 3,584, 13,440, and 23,040, respectively. Thus, if the modulation cycle begins at time t=0 (for all three sites because of synchronization), then at t=0 site A will modulate using the chip at chip index 3,584, site B will modulate using the chip at chip index 13,440, and site C will modulate using the chip at chip index 23,040. Each site will progress through the remaining 32,767 chips of modulation and arrive back at its respective starting chip index after t=26.67 ms, then start again. As a consequence, during any given time interval, the pilot signals from sites A, B, and C will be modulated differently from one another. Hence, the pilot signal from a wireless service site may be considered as carrying a signature of the site's PN offset. As such, PN offsets serve as a form of identification of wireless service sites.

Because of the relationship of starting chip offset to phase of the modulation cycle, PN offset is sometimes also referred to as "PN phase." Note that while the modulation has been described here in relation to the pilot signal, the same chip-by-chip modulation is applied concurrently to all the forward channels transmitted by a wireless service site.

An access terminal that receives a pilot signal from a given wireless service site may decode the signal by reversing the modulation process using the same PN short code. In doing so, the signal may be "mapped" to a "chip space" representation in which the signal appears at the chip index corresponding to the PN offset of the given wireless service site. As used herein, the phrase "chip index of a wireless service site" (or similar phrase) will be taken to mean the chip index corresponding to the PN offset of the wireless service site. As referred to above, the pilot signal strength of a sector (i.e., T_ADD) corresponds to the power level of the mapped signal at the chip index of the PN offset of the sector.

In practice, the access terminal will typically be located at some distance from the given wireless service site, so the received signal will be subject to a propagation delay equal to the distance divided the propagation speed of the signal (very nearly equal to the speed of light). Because the signal may be considered as being transmitted in chips at a given chip rate, the propagation delay may be reckoned in chips as well. More specifically, for a chip rate R of 1.2288 Mcps, each chip corresponds to a distance of c/R=0.15 miles (800 feet), where c is the speed light. Thus, each 800 feet of distance between the access terminal and the wireless serving site yields one chip of delay. Consequently, if the same clock reference used to synchronize the wireless service sites were to be applied to the access terminal, then the pilot signal from a given wireless service site would, after demodulation, be mapped to an observed chip index that is larger than the expected chip index of the given site by an amount equal to the propagation delay (in chips). In such an arrangement, the synchronization clock would effectively provide a reference phase for the access terminal. However, while this explanation is useful for illustrating how propagation delay manifests in the demodulation of chip-based transmissions, a different form of reference phase is typically used by the access terminal.

Operationally, the pilot signal from the access terminal's serving sector (or "serving wireless service site," in keeping with the present terminology) is used to set the reference phase. To do so, the access terminal uses the known chip index of the serving wireless service site (determined from the site's known PN offset) to adjust the chip space map such that the observed chip index of the serving wireless service site exactly lines up with the known (or expected) chip index of the site. Thus, the access terminal effectively compensates for the propagation delay from the serving wireless service site. Even as the access terminal moves about and the distance (and propagation delay) from the serving wireless service site to the access terminal changes, the chip space map is constantly adjusted so that the observed chip index of the serving wireless service site always appears at the site's known (or expected) chip index; i.e., with zero phase delay.

In contrast to the demodulation of the pilot signal from the serving wireless service site, the pilot signals from all other wireless service sites are demodulated and mapped to chip space with observed phases (i.e., observed chip indexes) that are determined relative to the reference phase set by pilot signal from the serving wireless service site. In other words, the access terminal does not compensate for the propagation delays of these other signals, but rather determines their delays relative to that from the serving wireless service site. Consequently, the observed chip index of a given wireless service site (other than the serving site) may appear in chip space with a "phase shift" relative to the expected phase (or expected chip index) of the given wireless service site. Phase shift, written as "$\Delta\phi$," may be reckoned in chips as described above.

Since the observed phase is determined relative to the reference phase, the phase shift represents a difference between (i) the distance from the access terminal to the given wireless service site and (ii) the distance from the access terminal to the serving wireless service site. This difference between distances is referred to herein as a "differential distance," and is written "$\Delta(distance)$." More specifically, taking the distance from the access terminal to the serving wireless service site to be "$d_1$," and the distance from the access terminal to the given wireless service site to be "$d_2$," the differential distance is given by $\Delta(distance)=d_2-d_1$. Note that $d_1$ is also referred to herein as a "reference distance."

Expressed in terms of phase shift, differential distance can also be written "$d(\Delta\phi)$." That is, $\Delta(distance)\equiv d(\Delta\phi)$. Thus, the differential distance can be determined from the phase shift, and vice versa. Note that since the distance between the access terminal and the given wireless service site can be larger or smaller than (or the same as) the distance between the access terminal and the serving wireless service site, the differential distance can be positive, negative, or zero, and the phase shift may be correspondingly positive, negative, or zero.

Figure 4:
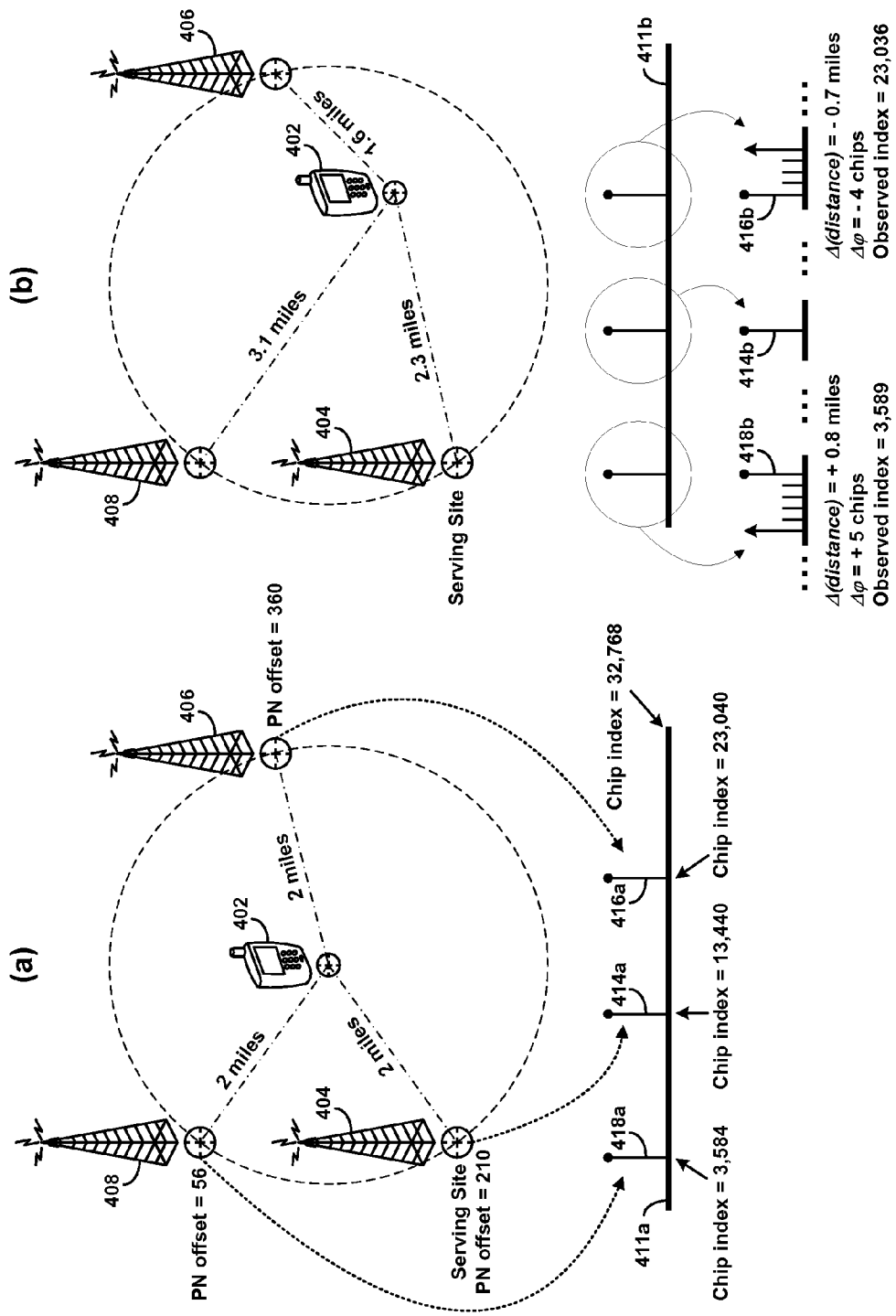
FIG. 4 is an illustration of the relationship between phase shift and differential distance.

The relationship between distance and phase shift is illustrated in FIG. 4(*a,b*), which depicts access terminal 402, and three wireless serving sites: serving site 404 with PN 210, site 406 with PN 360, and site 408 with PN 56. In FIG. 4*a*, access terminal 402 is shown to be equidistant from the three sites, as indicated by its position at the center of a dotted circle on which the three sites are located. For purposes of illustration, the radius of the circle is taken to be two miles. A horizontal line (or axis) at the bottom of FIG. 4*a* represents chip space 411*a*, wherein the observed positions of the pilot signals from the three sites are depicted as vertical lines, each with a large "dot" (or "pinhead") at the top. As indicated by a curved, dotted line pointing from each site to the site's pilot signal in chip space, signal 414*a* comes from serving site 404, signal 416*a* comes from site 406, and signal 418*a* comes from site 408. Also indicated are the respective chip indexes of the three sites (computed from their PN offsets): 13,440 for signal 414a, 23,040 for signal 416a, and 3,584 for signal 418a. The location of the highest chip index (32,768) at the right end of chip space 411a is also shown for orientation and scale.

Note that chip space also properly comprises a representation of the strength of the pilot signals according to their vertical lengths. However, for the present illustration of phase shift, it may be assumed that each of the signals is detectable above a requisite threshold. In any case, the principles underlying the relationship between distance and phase shift do not generally depend on signal strength. In practice, however, the signals must be detectable at the AT, and a detection threshold is preferably required as well.

As depicted in FIG. 4a, the pilot signal from each of the three sites is observed in chip space 411a at its expected chip index. For serving site 404, the phase shift is zero by virtue using the serving pilot signal to set the reference phase. Since the phase of each of the other two pilot signals is determined relative to the phase of the serving site's pilot signal, and the sites are all at the same distance from access terminal 402, the phase shift of signals 416a and 418a is also zero.

In FIG. 4b, AT 402 has moved off the center of the circle such that its distance to each of sites 404, 406, and 408 is 2.3 miles, 1.6 miles, and 3.1 miles, respectively. In this case, the signals from sites 406 and 408 will each exhibit a phase shift, as indicated in chip space 411b. Because each phase shift is a small number of chips compared with the size of chip space, the expected and observed chip indexes are depicted in magnified views, as represented by the small circle around each pilot signal in chip space 411b and the downward, curved arrow pointing to the enlarged perspective. In the magnified view, signal 414b from serving site 404 still has a phase shift of zero, since the serving site's signal is used to set the reference phase. For each of the other two signals, the expected chip index is indicated by an upward arrow in the magnified region of chip space, while the observed index is indicated by a vertical line with a pinhead top.

Since AT 402 is now 0.8 miles further from site 408 than it is from serving site 404, Δ(distance)=+0.8 miles. Using the relationship between chips and distance described above, this corresponds to Δφ=+5 chips (rounded to the nearest chip). In FIG. 4b, the expected chip index (upward arrow) is still 3,584. However, as a result of the positive differential distance, signal 418b is actually observed at chip index 3,589.

The situation is similar for the pilot signal from site 406, except that the phase shift is negative since AT 402 is 0.7 miles closer to this site than to the serving site. Thus, in this case Δ(distance)=−0.7 miles, corresponding to Δφ=−4 chips (rounded to the nearest chip). As shown in FIG. 4b, the observed chip index of signal 416b is 23,036, four chips earlier than the expected chip index of 23,040.

In practice, a signal from a wireless service site may traverse a line-of-sight path to an access terminal, and in addition experience one or more reflections between the site and the access terminal, resulting in multiple versions of the signal being received with slight relative delays between them. Consequently, the signal will be detected most strongly at one chip (e.g., corresponding to the line-of-sight path), and more weakly in one or more neighboring chips. The access terminal adapts to this so-called multi-path phenomenon by simultaneously tuning to different chips using different "fingers" of a RAKE receiver.

More particularly, under IS-2000 (and other CDMA families of protocols), the access terminal will typically tune three RAKE fingers to the pilot signal from its wireless serving site: one tuned to the chip index of the strongest signal and two tuned at neighboring chip indexes of the next two strongest signals. Then with a fourth RAKE finger, the access terminal will search chip space in the vicinities of expected chip indexes of wireless service sites in its neighbor list. For the purposes of the present discussion, the multi-path phenomenon may be ignored with respect to the serving pilot signal, and just the searching of chip space in the vicinities of neighbor-list pilot signals considered.

As an example, taking sites 406 and 408 in FIG. 4b as neighbor sites of AT 402, a search of chip space 411b in the vicinity of chip index 3,584 (the expected chip index of site 408) preferably will yield signal 418b. Operationally, the "vicinity" of any particular chip index is defined in terms of a window in chip space within which the particular chip index is located. For instance, the particular chip index could be located at the center (or some other interior location) of a 60-chip window. Then, a search in the vicinity of a neighbor site would preferably entail a search within a pre-defined window in chip space within which the neighbor site's chip index is located. Similarly, a search in the vicinity of chip index 23,040 (the expected chip index of site 406) preferably will yield signal 416b. If both signals are detected at T_ADD or greater, the access terminal will send a PSMM to serving site 404 indicating the respective signal strengths and their observed chip indexes. It would then be up to the base station (or some other network element such as a BSC or RAN) to determine if the observed signals actually belong to sites 406 and 408. That is, while wireless service sites 404, 406, and 408 are correlated with pilot signals 414, 416, and 418 by construction of the illustration of FIG. 4(a,b), in actual operation, the base station (e.g., BSC or RAN) determines the identity of the sites based on the signal strengths and chip indexes reported in the PSMM. Preferably, the base station makes this determination by selection of a most-likely match between the observe signal reported in the PSMM and the know PN phase of wireless service sites in the AT's neighbor list.

Under various conditions based on, among other factors, topology of wireless service sites, signal strengths, and the position of the access terminal, it is possible for a signal to be detected by the access terminal in a vicinity of chip space normally searched for a particular neighbor site, wherein the detected signal is not that of the particular neighbor site. For example, if a site with PN 357 and an expected chip index of 22,848 were detected by AT 402 at a differential distance of +26 miles (i.e., 26 miles further than the serving site's distance from AT 402), that site's pilot signal would appear in chip space with a phase shift of +172 chips, or at a chip index of 23,020. In this case, the search of chip space in the vicinity of PN 360 (chip index 23,040) might pick out the signal, mistaking it for that of neighbor site 406 at a negative phase shift of −20 chips. As another example, if a site different from neighbor site 406 but one also using PN 360 were detected by AT 402 at a differential distance of +10 miles, that site's pilot signal would appear in chip space with a phase shift of +66 chips, or at a chip index of 23,106. In this case, the search might pick out the signal, mistaking it for that of neighbor site 406 at the same 66-chip phase shift.

In accordance with the preferred embodiment, the base station (e.g., BSC or RAN) will advantageously combine the phase information in the PSMM (or other message carrying the information) with known positions and distances in order to either validate the identity the site associated with the detected signal as that of the neighbor site, or to reject the signal as not belonging to the neighbor. If the site identity is confirmed, then the site may be deemed a valid choice for providing service to the access terminal. Under IS-2000, the base station can then instruct the access terminal to add the site to its active set, although it may still choose not to do so.

If the site identity is not confirmed, then the site will be rejected for being an invalid choice (e.g., mis-identified) for providing service. Under IS-2000, the base state would refrain from instructing the access terminal to add the site to its active set. Advantageously, this would prevent the access terminal from attempting to hand off to the mistakenly-identified site.

Figure 5:
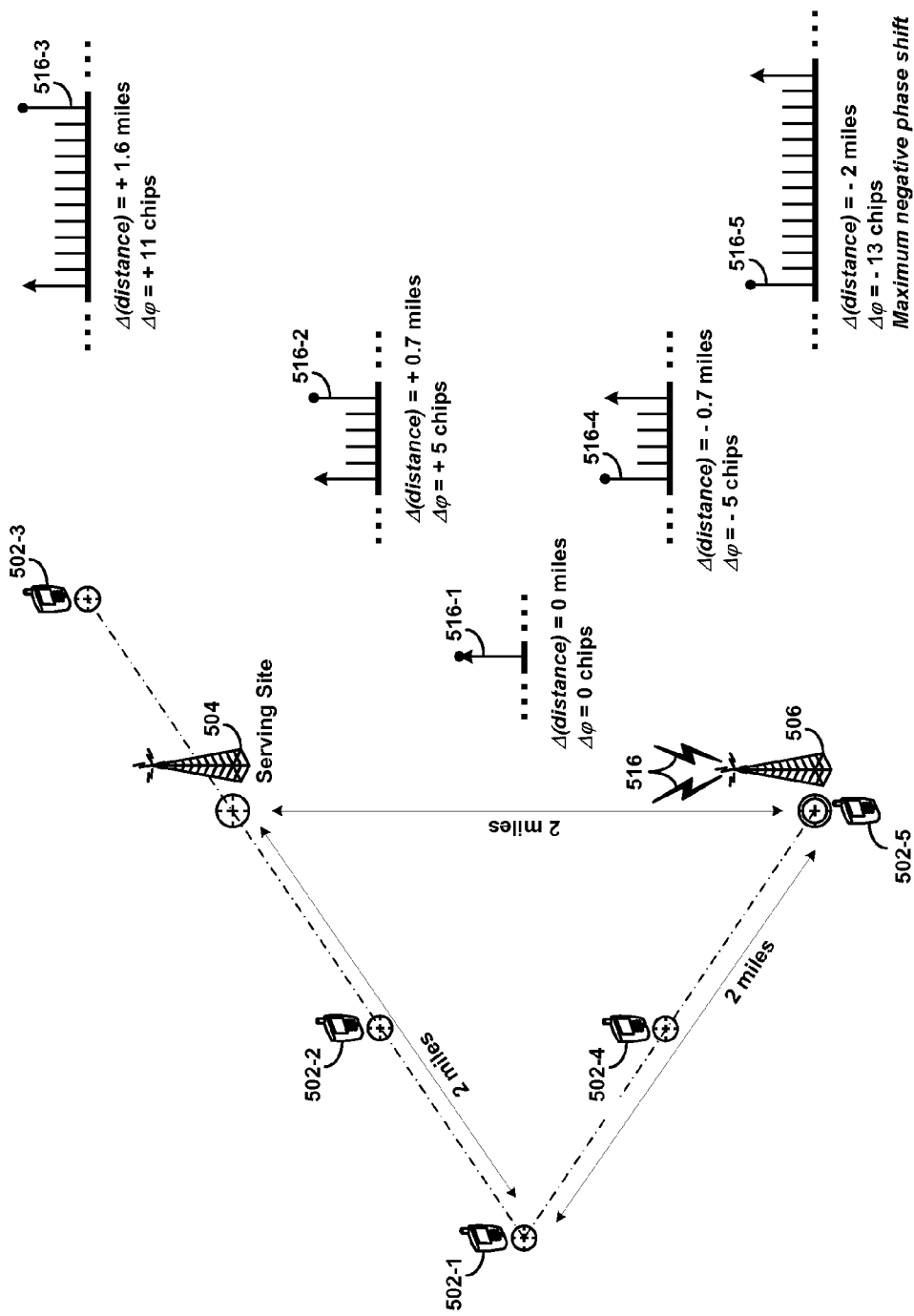
FIG. 5 illustrates phase shift and differential distance for five different locations of an access terminal with respect to a serving wireless service site and another wireless service site.

FIG. 5 illustrates one aspect of how the base station may validate or reject a possible identity of a site based on phase information. In the figure, AT 502 is depicted at five different locations, designated 502-1, 502-2, 502-3, 502-4, and 502-5. Also shown are two wireless service sites, serving site 504 and site 506. As indicated, the distance between the two sites is two miles; this distance is used for purposes of illustration only. Site 506 is emitting pilot signal 516, indicated by the "lightning-bolt" lines. The figure illustrates the phase shift in chip space of pilot signal 516 as observed at the access terminal for each of the five positions of the access terminal. The positions of the expected and observed chip indexes are shown using the same graphic symbols as in FIG. 4. Note, however, that no specific values of chip indexes are indicated.

At position 502-1, the access terminal is equidistant from both sites, so the differential distance is zero and corresponding phase shift of 516-1 is also zero. At position 502-2, the differential distance is +0.7 miles, so the phase shift of 516-2 is +5 chips. Similarly, at position 502-3, the differential distance is +1.6 miles, so the phase shift of 516-3 is +11 chips.

In the opposite direction, at position 502-4, the differential distance is −0.7 miles, so the phase shift of 516-4 is −5 chips. Finally, at position 502-5 where the access terminal is co-located with site 506, the differential distance is −2.0 miles, so the phase shift of 516-5 is −13 chips.

Note that the phase shift at position 502-5 represents a propagation delay of zero between site 506 and access terminal 502. The pilot signal from site 506 cannot arrive at the access terminal any earlier than that from serving site 504 for any other position of the access terminal. Thus, there can be no phase shift more negative than that measured when the distance between AT 502 and site 506 is zero. At this position, the differential distance is equal to the negative of the distance between the access terminal and its serving wireless service site, or in the terminology introduced above, $d(\Delta\phi)=-d_1$. In other words, $-d_1$ sets a limit for how negative $d(\Delta\phi)$ can be if $d(\Delta\phi)$ is based on a valid identification of PN offset. Thus, if $\Delta\phi$ is determined to correspond to a distance more negative that $-d_1$, then the PN offset used to determine $\Delta\phi$ must be a mis-identification, and can be rejected for being an invalid identification.

The condition on $\Delta\phi$ for a negative phase shift can also be derived from the relationship between $d(\Delta\phi)$, $d_1$, and $d_2$ (the distance between the access terminal and the wireless service site of interest). Since $d_2$ must be positive, it follows that $d_2=d_1+d(\Delta\phi)\geq 0$, or $d_1\geq -d(\Delta\phi)$. When $\Delta\phi$ is negative so is $d(\Delta\phi)$, and the expression then becomes $|d(\Delta\phi)|\leq d_1$, where $|d(\Delta\phi)|$ is the absolute value of $d(\Delta\phi)$. Preferably, the reference distance $d_1$ can be determined by measuring the round-trip delay of a timing (or other) signal between the access terminal and the serving wireless service site, multiplying the delay by the propagation speed of the signal (i.e., the speed of light) and dividing by two.

Figure 6:
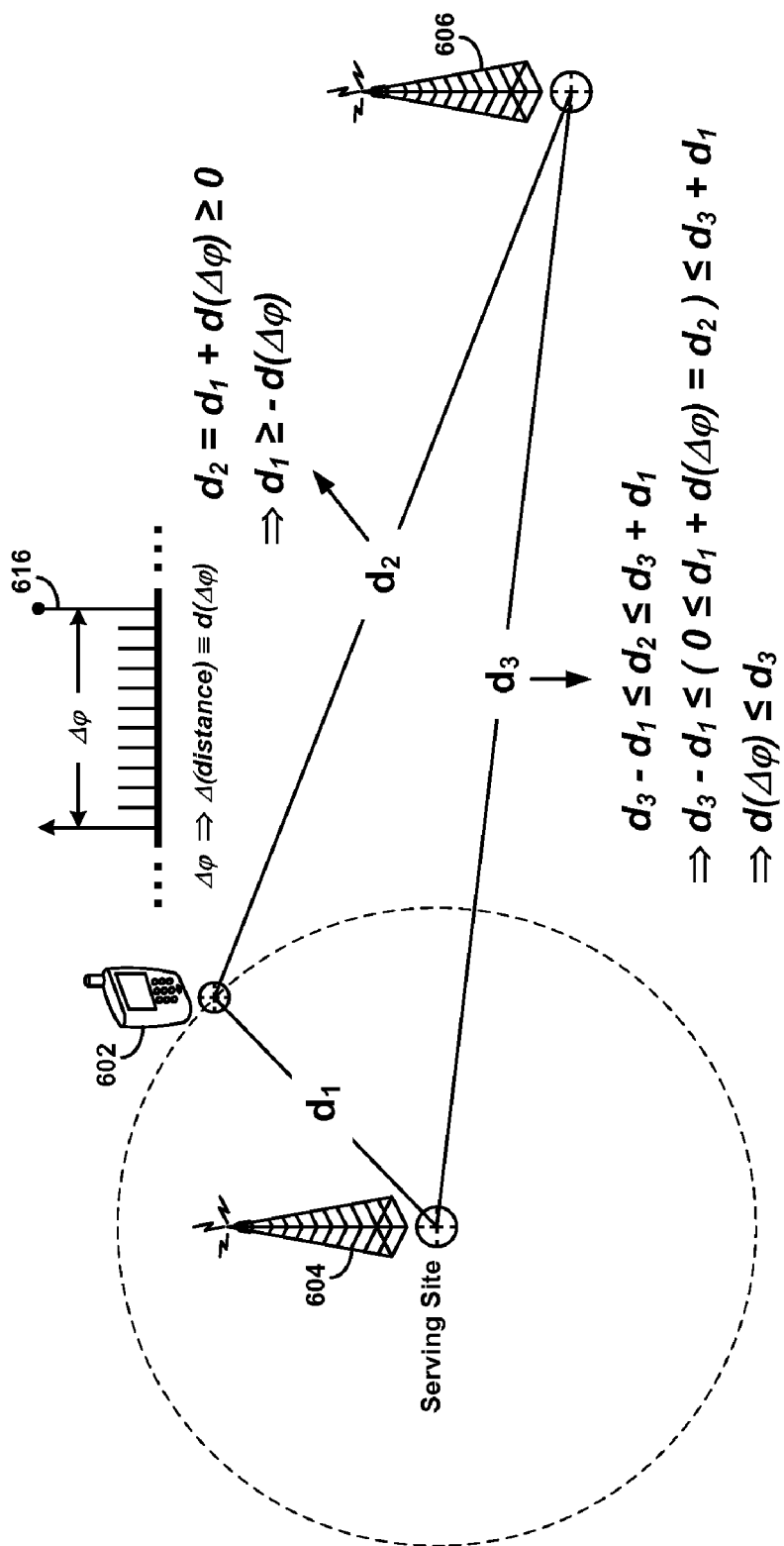
FIG. 6 illustrates two bounds tests that are applied to differential distance in order to confirm that a wireless service site is a valid choice for providing service to an access terminal.

A positive phase shift may also be used to determine whether a given wireless service site has been correctly identified by comparing the differential distance with a known distance between the given wireless service site and the serving wireless service site. FIG. 6 illustrates how this is can be achieved. In the figure, AT 602 is shown to be at reference distance $d_1$ from serving site 604 and at distance $d_2$ from site 606. The distance between serving site 604 and site 606 is shown to be $d_3$. Using the same graphic symbols as above to represent expected and observed chip indexes, pilot signal 616 from site 606 is shown to be observed at AT 602 with a positive phase shift $\Delta\phi$, corresponding to a differential distance of $d(\Delta\phi)$.

The trigonometry of triangle $d_1d_2d_3$ yields the relation $d_3-d_1\leq d_2\leq d_3+d_1$. This can also be demonstrated by moving AT 602 anywhere along the dotted circle of radius $d_1$ in the figure. Using the expression above for $d_2$, i.e., $d_2=d_1+d(\Delta\phi)$, it follows that $d(\Delta\phi)\leq d_3$. Thus, $d_3$ sets a limit on $d(\Delta\phi)$ if the PN used to determine $\Delta\phi$ has been correctly identified. Conversely, if $d(\Delta\phi)>d_3$, then $\Delta\phi$ cannot have been determined from a correct identification of a wireless service site that is at a distance $d_3$ from the serving wireless service site.

Since for this case $\Delta\phi$ and $d(\Delta\phi)$ are both positive, there is no loss in generality in rewriting the above condition as $d_3\geq |d(\Delta\phi)|$. Preferably, $d_3$ can be determined from known position information of the wireless service sites of the wireless communication system. For instance, a base station (e.g., BSC or RAN) can use the known latitude and longitude of the serving wireless service site and the wireless service site used in determining $\Delta\phi$ in order to derive $d_3$.

As demonstrated in the above examples, the phase shift $\Delta\phi$ determined from the observed chip index in chip space of a pilot signal from a wireless service site depends on the expected chip index of the signal, which in turn depends on a postulated identity of the wireless service site. If the postulated identity of the wireless service site is correct, then the determined phase shift is correct. However, if the postulated identity is wrong, then the determined phase shift could be wrong. The bounds set above on $|d(\Delta\phi)|$ effectively provide tests for validating or rejecting the postulated identity of the wireless service site, since $d(\Delta\phi)$ is computed based on the postulated identity.

According to the exemplary embodiment, then, the access terminal will report to its serving base station the phases and power levels of pilot signals detected in searches of chip space in the vicinities of the expected PN phases of its neighbors. The report preferably will be sent in a PSMM. For each observed phase reported in the PSMM, the base station will then determine a phase shift based on a postulated identity of the wireless service site that emitted the observed pilot signal. Depending whether the phase shift is positive, negative, or zero, the base station will apply one of the bounds tests described above in order to either validate or reject the postulated identity. More specifically, the bounds tests will be applied according to:

$|d(\Delta\phi)|\leq d_1$ if $\Delta\phi<0$, and

In this form, $d_1$ and $d_3$ may each be considered as a "threshold distance" against which $|d(\Delta\phi)|$ is compared.

If the postulated identity is confirmed, the wireless service site so identified will be considered a valid choice for providing service to the access terminal, and the base station can then send an HDM (or other similar message) to the access terminal, thereby instructing the access terminal to add the wireless service site to its active set. If the postulated identity fails to be confirmed, the base station will not instruct the access terminal to add the wireless service site to its active set.

In the exemplary embodiment described above, the reference phase, the expected phase, the observed phase, and the phase shift are all reckoned in terms of chips and chip indexes in chip space. However, the principles relating distances and distance bounds to propagation delay, differences in propagation delay, reference phases, expected phases, observed phases, and phase shift are not limited to observations, measurements, and determinations made in terms of chips in chip space. Moreover, different lengths of PN sequences could be used, as could different values of N and K, and even different schemes for subdividing PN sequences to pick out specific chip indexes to assign to wireless service sites. Additionally, the signal used in embodiments of the present invention could be other than pilot signals. Finally, the postulated identity of the wireless service site is preferably that of a site that is considered an option for providing service to the access terminal. However, it need not be specifically a neighbor site.

Accordingly, it is contemplated that any embodiment more generally employing the underlying principles described above would be within the scope and spirit of the present invention. As an example of such an embodiment, an access terminal could use a reference signal from its serving wireless service site to establish a reference phase. The reference phase could then be used to determine the observed phase of a particular signal from a given wireless service site (other than the serving site). An expected phase of the particular signal would preferably be determined based on a postulated identity of the given wireless service site, and a phase shift could then be computed as the difference between the observed phase and the expected phase of the particular signal. The phase shift would then be converted to a differential distance, and one or both of the bounds tests described above could be applied to validate or reject the postulated identity. If the identity is confirmed, the given wireless service site can then be considered a valid choice for providing service to the access terminal. Note that the determination of phase shift and application of the bounds tests could be carried out at the access terminal, at the serving base station (or other network element), or a combination of both.

3. EXEMPLARY OPERATION OF USING PHASE SHIFT TO DETERMINE VALID NEIGHBORS

Figure 7:
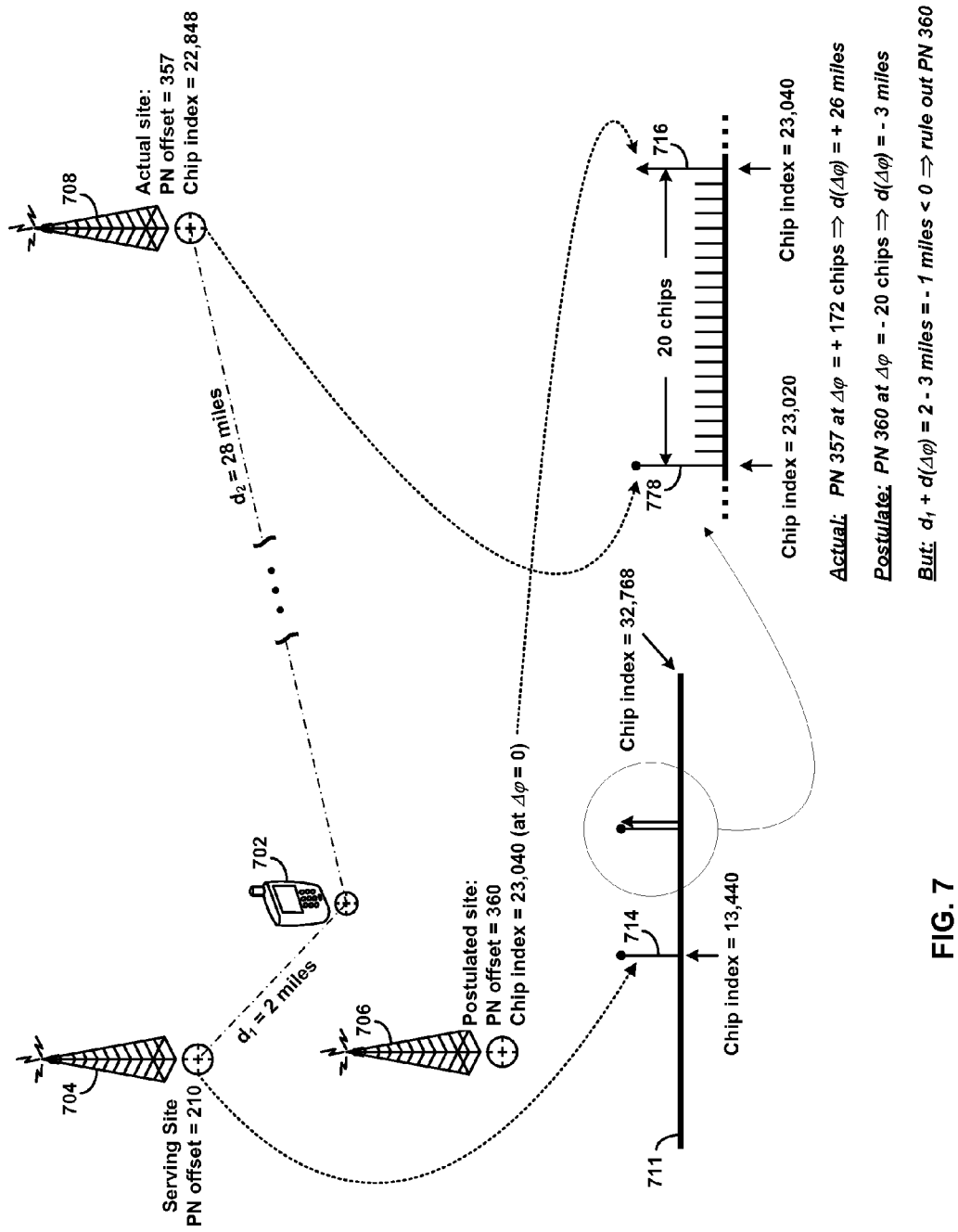
FIG. 7 illustrates an embodiment wherein a negative phase shift is tested to confirm or reject a wireless service site as being a valid choice for providing service to an access terminal.
Figure 8:
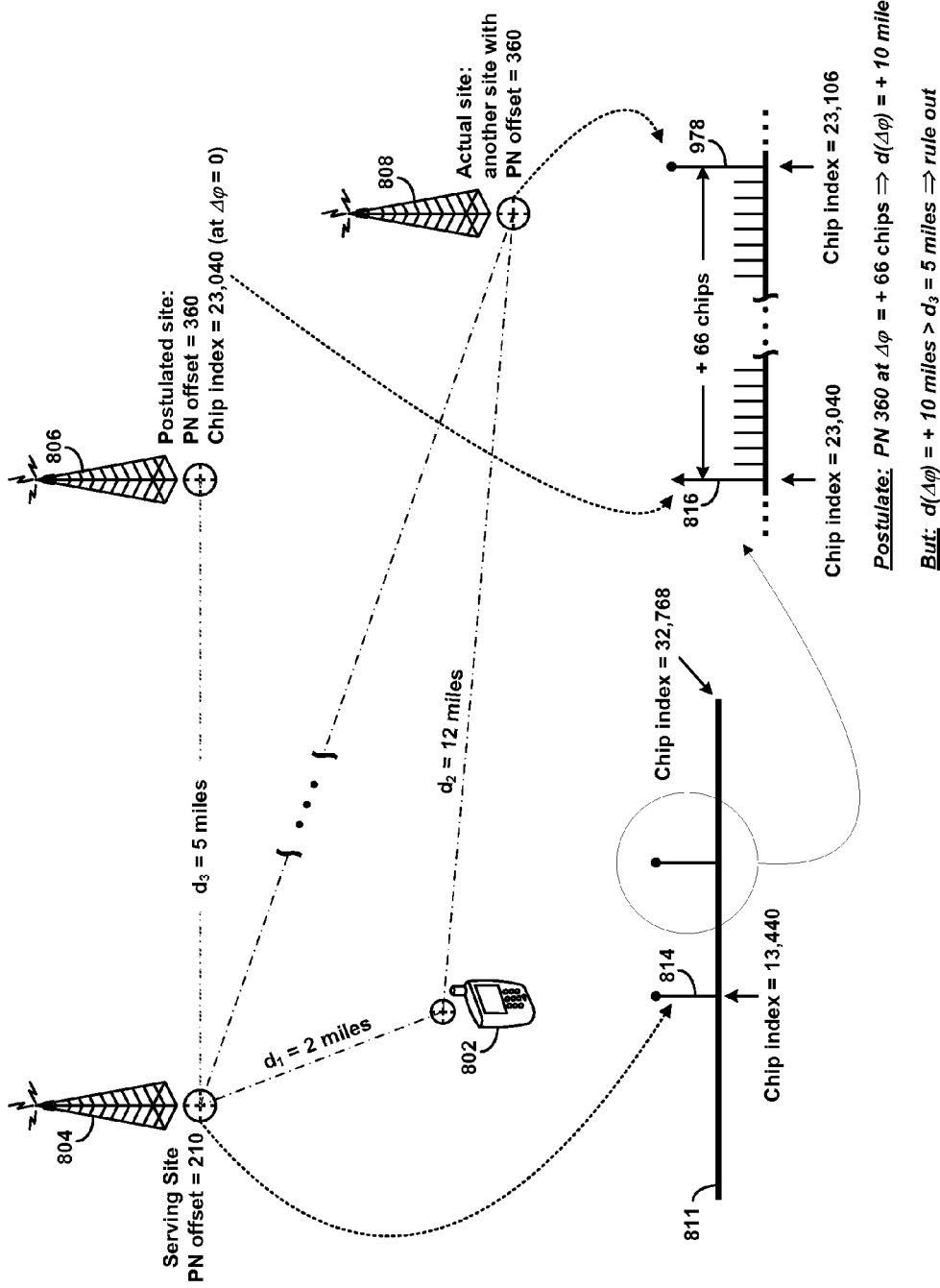
FIG. 8 illustrates an embodiment wherein a positive phase shift is tested to confirm or reject a wireless service site as being a valid choice for providing service to an access terminal.

Exemplary operation of using phase shift to determine valid neighbors can be described by considering FIGS. 7 and 8, which illustrate two possible instances of potential misidentification of a wireless service site. In FIG. 7, access terminal 702 is two miles from its serving site 704 and 28 miles from site 708, which has PN 357 (or chip index 22,848). Thus, $d_1=2$ miles, $d_2=28$ miles, and $\Delta(\text{distance})=d_2-d_1=26$ miles. Also shown is the site 706 with PN 360 (or chip index 23,040), assumed to be in the access terminal's neighbor list. In this illustration, the access terminal does not detect a signal from neighbor site 706, but does detect signal 778 from site 708 at observed chip index 23,020, or at a true phase shift of +172 chips. Assuming AT 702 considers the detection to be in the search vicinity (in chip space) of site 706, it will send a PSMM to its serving base station reporting the power level and observed chip index of the signal.

The base station preferably knows the entries in neighbor list of AT 702, and thus recognizes the detected signal to be within the search vicinity of site 706. Thus, the base station will postulate the identity to be PN 360 and derive an expected chip index of 23,040. Based on this postulation of expected chip index, the base station will determine a phase shift of −20 chips, or $d(\Delta\phi)=-3$ miles. The base station will then determine the reference distance from serving site 704 to AT 702 as $d_1=2$ miles, preferably using a round-trip delay measurement as described above. Finally, the base station will determine that $|d(\Delta\phi)|=3$ miles>2 miles, and thereby rule out PN 360 as a valid identification. Based on this result, the base station will not send an HDM to the access terminal, and hence the access terminal will not add PN 360 to its active set.

In FIG. 8, AT 802 is two miles from its serving site 804 and 12 miles from site 808, which has PN 360. Thus, $d_1=2$ miles, $d_2=12$ miles, and $\Delta(\text{distance})=d_2-d_1=10$ miles. Site 806 shown in the figure also has PN 360, and is at a distance $d_3$ of 5 miles from serving site 804. Site 806 is taken to be in the access terminal's neighbor list. Although both sites 806 and 808 use PN 360, the inclusion of PN 360 in the access terminal's neighbor list is assumed to apply only to site 806. In this illustration, the access terminal does not detect a signal from neighbor site 806, but does detect signal 878 from site 808 at observed chip index 23,106, or at a phase shift of +66 chips. Assuming AT 802 considers the detection to be in the search vicinity (in chip space) of site 806, it will send a PSMM to its serving base station reporting the power level and observed chip index of the signal.

As with the previous example, the base station will postulate the identity to be PN 360 and derive an expected chip index of 23,040. Based on this postulation of expected chip index, the base station will determine a phase shift of +66 chips, or $d(\Delta\phi)=10$ miles. The base station will then determine the distance from serving site 804 to site 806 as $d_3=5$ miles, preferably using the latitude and longitude of both sites as described above. Finally, the base station will determine that $|d(\Delta\phi)|=10$ miles>5 miles, and thereby rule out PN 360 as a valid identification. Based on this result, the base station will not send an HDM to the access terminal, and hence the access terminal will not add PN 360 to its active set.

In either (or both) of the above examples, if the observed pilot signal did come from the postulated wireless service site, the relevant distance bounds test would not fail. The base station could then consider the postulated identity to be validated as the true identity of the wireless service site. This would make the wireless service site a valid choice for providing service to the access terminal, assuming other conditions, such as signal power level, were met. The base station could then send an HDM to the access terminal instruction it to add the wireless service site to the active set.

4. CONCLUSION

An exemplary embodiment of the present invention has been described above. Those skilled in the art will understand, however, that changes and modifications may be made to this embodiment without departing from the true scope and spirit of the invention, which is defined by the claims.

What is claimed is:

1. In a wireless communication system that includes wireless service sites and that provides service to access terminals, a method of confirming that a wireless service site is valid choice for providing service to an access terminal, the method comprising:

receiving a particular signal at the access terminal from the wireless service site;

receiving a reference signal at the access terminal from a serving wireless service site;

determining a reference phase based on the reference signal;

determining an observed phase of the particular signal, the observed phase being a phase of the particular signal measured relative to the reference phase;

determining an expected phase of the particular signal based on a postulated identity of the wireless service site;

determining a phase shift of the particular signal as a difference between the observed phase of the particular signal and the expected phase of the particular signal;

converting the determined phase shift into a differential distance; and confirming the wireless service site to be a valid choice for providing service to the access terminal upon a determination that the differential distance does not exceed a threshold distance.

2. The method of claim 1, wherein the determined phase shift corresponds to a time difference between (i) a propagation delay of the particular signal from the wireless service site to the access terminal and (ii) a propagation delay of the reference signal from the serving wireless service site to the access terminal, and wherein converting the determined phase shift into the differential distance comprises:

computing the differential distance from the time difference by multiplying a known propagation speed of the particular signal by the time difference.

3. The method of claim 2, wherein the differential distance is one of positive, negative, and zero, and wherein confirming the wireless service site to be a valid choice for providing service to the access terminal comprises:

determining a reference distance between the access terminal and the serving wireless service site;

determining an inter-site distance between the wireless service site and the serving wireless service site;

setting the threshold distance to (i) the reference distance if the differential distance is negative, or (ii) the inter-site distance if the differential distance is positive or zero; and confirming the postulated identity of the wireless site to be the identity of the wireless service site upon a determination that an absolute value of the differential distance does not exceed the threshold distance.

4. The method of claim 3, wherein determining the reference distance between the access terminal and the serving wireless service site comprises:

measuring a round-trip delay of a timing signal between the access terminal and the serving wireless service site; and computing the reference difference from the round-trip delay by multiplying a known propagation speed of the timing signal by one half of the round-trip delay.

5. The method of claim 3, wherein determining the inter-site distance between the wireless service site and the serving wireless service site comprises computing the inter-site distance based on a known geographic latitude and longitude of the wireless service site and a known geographic latitude and longitude of the serving wireless service site.

6. The method of claim 1, wherein the particular signal is a pilot signal of the wireless service site encoded using a pseudo-random number (PN) sequence and a particular PN offset of the PN sequence, the particular PN offset being indicative of the identity of the wireless service site, and wherein determining the phase shift of the particular signal comprises:

postulating an expected chip index of the PN sequence, the expected chip index being the expected phase; and computing the phase shift as a difference between the expected chip index and an observed chip index of the particular signal.

7. The method of claim 6, wherein postulating the expected chip index of the PN sequence comprises:

receiving a reference pilot signal at the access terminal from a serving wireless service site;

determining a reference chip index based on the reference pilot signal;

determining the observed chip index of the particular signal as a chip index of the particular signal, counted relative to the reference chip index, at which a measured power level at the access terminal exceeds a threshold power level; and postulating the expected chip index to be a specific one of a plurality of particular chip indexes according to a likely match between the specific one the plurality of particular chip indexes and the observed chip index, wherein the plurality of particular chip indexes corresponds to a plurality of known PN offsets.

8. The method of claim 7, wherein the determined phase shift is measured as a number of chips of the PN sequence, the particular signal is transmitted from the wireless service site according to a rate of R chips per unit time, and wherein converting the determined phase shift into the differential distance comprises:

computing the differential distance by dividing a propagation speed of the particular signal by R and multiplying by the number.

9. The method of claim 8, wherein the differential distance is one of positive, negative, and zero, and wherein confirming the wireless service site to be a valid choice for providing service to the access terminal comprises:

determining a reference distance between the access terminal and the serving wireless service site;

setting the threshold distance to (i) the reference distance if the differential distance is negative, or (ii) a known distance between the wireless service site and the serving wireless service site if the differential distance is positive or zero; and confirming the postulated identity of the wireless site to be the identity of the wireless service site upon a determination that an absolute value of the differential distance does not exceed the threshold distance.

10. The method of claim 7, wherein the plurality of known PN offsets corresponds to a list of neighbor wireless service sites of the access terminal, and wherein postulating the expected chip index to be a specific one of the plurality of particular chip indexes comprises:

determining that the observed chip index is within a window in chip space that is associated with a PN offset of a particular neighbor wireless service site in the list of neighbor wireless service sites; and postulating the expected chip index to be a chip index corresponding to the PN offset of the particular neighbor wireless service site.

11. The method of claim 10, wherein confirming the wireless service site to be a valid choice for providing service to the access terminal comprises confirming the wireless service site to be the particular neighbor wireless service site.

12. The method of claim 1, wherein the wireless communication system comprises a radio access network, the radio access network including at least one of (i) a base transceiver station, (ii) a base station controller, and (iii) a radio node controller, and wherein:

determining the phase shift of the particular signal comprises at the radio access network, determining the phase shift of the particular signal;

converting the determined phase shift into the differential distance comprises at the radio access network, converting the determined phase shift into the differential distance; and confirming the wireless service site to be a valid choice for providing service to the access terminal comprises at the radio access network, confirming the wireless service site to be a valid choice for providing service to the access terminal.

13. In a wireless communication system (i) comprising radio access networks, each with at least one wireless service site, and (ii) providing service to access terminals, a method of confirming that a wireless service site is a valid choice for providing service to an access terminal, the method comprising:

at the access terminal, receiving both a particular pilot signal from the wireless service site and a reference pilot signal from a serving wireless service site;

determining a reference phase based on the reference pilot signal;

determining an observed phase of the particular pilot signal relative to the determined reference phase of the reference pilot signal;

sending a message from the access terminal to a radio access network, the message containing information indicative of at least the observed phase of the particular pilot signal;

at the radio access network, determining a phase shift of the particular pilot signal relative to an expected phase of the particular pilot signal, wherein the expected phase of the particular signal is determined based on a postulated identity of the wireless service site;

at the radio access network, converting the determined phase shift into a differential distance; and at the radio access network, confirming the wireless service site to be a valid choice for providing service to the access terminal upon a determination that the differential distance does not exceed a threshold distance.

14. The method of claim 13, wherein the wireless communication system operates according to a CDMA family of protocols, the particular pilot signal is encoded using a pseudo-random number (PN) sequence and a PN offset associated with the wireless service site, and the reference pilot signal is encoded using the PN sequence and a PN offset associated with the serving wireless service site, and wherein determining the observed phase of the particular pilot comprises:

determining a reference chip index based on the reference pilot signal; and determining an observed chip index of the particular pilot signal as a chip index of the particular pilot signal, counted relative to the reference chip index, at which a measured power level at the access terminal exceeds a threshold power level.

15. The method of claim 14, wherein sending the message to a radio access network comprises sending a Pilot Strength Measurement Message to the radio access network.

16. The method of claim 14, wherein determining the phase shift of the particular pilot signal relative to the expected phase of the particular pilot signal comprises:

postulating an expected PN offset of the wireless service site, the expected PN offset corresponding to an expected chip index, and the expected chip index being the expected phase; and computing the phase shift as a difference between the expected chip index and the observed chip index of the particular pilot signal.

17. The method of claim 16, wherein the determined phase shift is measured as a number of chips of the PN sequence, the particular pilot signal is transmitted from the wireless service site according to a rate of R chips per unit time, and wherein converting the determined phase shift into the differential distance comprises:

computing the differential distance by dividing a propagation speed of the particular pilot signal by R and multiplying by the number.

18. The method of claim 17, wherein the differential distance is one of positive, negative, and zero, and wherein confirming the wireless service site to be a valid choice for providing service to the access terminal comprises:

determining a reference distance between the access terminal and the serving wireless service site;

setting the threshold distance to (i) the reference distance if the differential distance is negative, or (ii) a known distance between the wireless service site and the serving wireless service site if the differential distance is positive or zero; and confirming the postulated identity of the wireless site to be the identity of the wireless service site upon a determination that an absolute value of the differential distance does not exceed the threshold distance.

19. In a wireless communication system comprising a radio access network that includes wireless service sites and that provides service to access terminals, an improvement comprising:

means for receiving at an access terminal both a particular pilot signal from a wireless service site and a reference pilot signal from a serving wireless service site;

means for determining a reference phase based on the reference pilot signal;

means for determining an observed phase of the particular pilot signal relative to the determined reference phase of the reference pilot signal;

means for sending a message from the access terminal to a radio access network, the message containing information indicative of at least the observed phase of the particular pilot signal;

means for determining a phase shift of the particular pilot signal relative to an expected phase of the particular pilot signal, wherein the expected phase of the particular signal is determined based on a postulated identity of the wireless service site;

means for converting the determined phase shift into a differential distance; and means for confirming the wireless service site to be a valid choice for providing service to the access terminal upon a determination that the differential distance does not exceed a threshold distance.

20. The improvement of claim 19, wherein the wireless communication system operates according to a CDMA family of protocols, the particular pilot signal is encoded using a pseudo-random number (PN) sequence and a PN offset associated with the wireless service site, and the reference pilot signal is encoded using the PN sequence and a PN offset associated with the serving wireless service site, and wherein means for determining the observed phase of the particular pilot signal comprises:

means for determining a reference chip index based on the reference pilot signal; and means for determining an observed chip index of the particular pilot signal as a chip index of the particular pilot signal, counted relative to the reference chip index, at which a measured power level at the access terminal exceeds a threshold power level.

21. The improvement of claim 20, wherein means for determining the phase shift of the particular pilot signal relative to the expected phase of the particular pilot signal comprises:

means for postulating an expected PN offset of the wireless service site, the expected PN offset corresponding to an expected chip index, and the expected chip index being the expected phase; and means for computing the phase shift as a difference between the expected chip index and the observed chip index of the particular pilot signal.

22. The improvement of claim 21, wherein the determined phase shift is measured as a number of chips of the PN sequence, the particular pilot signal is transmitted from the wireless service site according to a rate of R chips per unit time, and wherein means for converting the determined phase shift into the differential distance comprises:

means for computing the differential distance by dividing a propagation speed of the particular pilot signal by R and multiplying by the number.

23. The improvement of claim 22, wherein the differential distance is one of positive, negative, and zero, and wherein means for confirming the wireless service site to be a valid choice for providing service to the access terminal comprises:

means for determining a reference distance between the access terminal and the serving wireless service site;

means for setting the threshold distance to (i) the reference distance if the differential distance is negative, or (ii) a known distance between the wireless service site and the serving wireless service site if the differential distance is positive or zero; and means for confirming the postulated identity of the wireless site to be the identity of the wireless service site upon a determination that an absolute value of the differential distance does not exceed the threshold distance.

* * * * *